United States Patent [19]

Swanson

[11] Patent Number: 5,788,913
[45] Date of Patent: Aug. 4, 1998

[54] PROCESSES TO PREPARE ANTIMONY DOPED TIN OXIDE ELECTROCONDUCTIVE POWDERS

[75] Inventor: Donald Keith Swanson, Wilmington, Del.

[73] Assignee: E. I. du Pont de Nemours and Company, Wilmington, Del.

[21] Appl. No.: 742,614

[22] Filed: Nov. 1, 1996

[51] Int. Cl.$^6$ .......................... H01B 1/08; C01G 19/02; C01G 30/00; C01B 13/36
[52] U.S. Cl. ...................... 252/520.1; 252/519.1; 423/92; 423/87; 423/593; 423/617; 423/618
[58] Field of Search .................. 252/518, 520.1, 252/519.1; 428/404; 423/92, 87, 593, 617, 618

[56] References Cited

U.S. PATENT DOCUMENTS

| | | | |
|---|---|---|---|
| 3,367,803 | 2/1968 | Loch | 136/238 |
| 4,246,143 | 1/1981 | Sonoda et al. | 252/518 |
| 4,373,013 | 2/1983 | Yoshizumi | 428/570 |
| 4,431,764 | 2/1984 | Yoshisumi | 524/409 |
| 4,452,830 | 6/1984 | Yoshizumi | 427/215 |
| 4,614,669 | 9/1986 | Yannopoulos | 427/87 |
| 4,655,966 | 4/1987 | Guillaumon et al. | 252/518 |
| 4,680,225 | 7/1987 | Ogawa et al. | 428/323 |
| 4,775,412 | 10/1988 | Nishikura et al. | 75/0.5 |
| 4,803,144 | 2/1989 | Hosoi | 430/106.6 |
| 5,051,209 | 9/1991 | Mirabeau et al. | 252/518 |
| 5,071,676 | 12/1991 | Jocobson | 427/214 |
| 5,104,583 | 4/1992 | Richardson | 252/518 |
| 5,192,613 | 3/1993 | Work, III et al. | 428/363 |
| 5,236,737 | 8/1993 | Linton | 427/126.3 |
| 5,281,365 | 1/1994 | Sohn et al. | 252/520 |
| 5,292,551 | 3/1994 | Jacobson | 427/215 |
| 5,326,633 | 7/1994 | Clough et al. | 428/288 |
| 5,330,833 | 7/1994 | Yamashita et al. | 428/364 |
| 5,476,613 | 12/1995 | Jacobson | 252/518 |
| 5,484,694 | 1/1996 | Lelental et al. | 430/530 |
| 5,626,975 | 5/1997 | Swank | 428/701 |
| 5,705,098 | 1/1998 | Okuda et al. | 252/518 |
| 5,716,553 | 2/1998 | Bergmann et al. | 252/518 |

FOREIGN PATENT DOCUMENTS

| | | |
|---|---|---|
| 0 025 583 | 3/1981 | European Pat. Off. |
| 0 147 213 | 7/1985 | European Pat. Off. |
| 0 359 569 | 3/1990 | European Pat. Off. |
| 60-49140 | 10/1985 | Japan |
| 61-3291 | 1/1986 | Japan |
| 61-286224 | 12/1986 | Japan |
| 1-14174 | 3/1989 | Japan |
| 2077473 | 3/1990 | Japan |
| 4(1992)-55320 | 2/1992 | Japan |
| 5-279042 | 10/1993 | Japan |
| 2 025915 | 1/1980 | United Kingdom |
| 2188313 | 9/1987 | United Kingdom |

OTHER PUBLICATIONS

Tsunashima et al., "Preparation and properties of antimony-doped SNO$_2$ films by thermal decomposition of tin 2-ethylhexanoate," *Journal of Materials Science 21* (1986).

Hermann et al., "Influence of Calcination on the Electrical Properties of Tin-antiomny Mixed Oxide Catalysts," *React. Kinet. Catal. Lett.*, vol. 12, No. 1, 51–56 (1979).

Paria et al., "Electrical conductivity and defect structure of polycrystalline tin dioxide doped with antomony oxide," *Journal of Materials Science* (1982).

Jarzebski et al., "Physical Properities of SnO$_2$ Materials—Preparation and Defect Structure," *Journal of the Electrochemical Society* (Jul. 1976).

Jarzebski et al., "Physical Properties of SnO$_2$ Materials—Electrical Properties," *Journal of the Electrochemical Society* (Sep. 1976).

Jarzebski et al., "Physical Properties of SnO$_2$ Materials—Optical Properties," *Journal of the Electrochemical Society* (Oct. 1976).

*Primary Examiner*—Douglas J. McGinty

[57] ABSTRACT

Solution precipitation processes for preparing antimony doped tin oxide having improved volumetric efficiency and improved wash efficiency involving use of concentrated base and metal salt solutions are disclosed.

6 Claims, 2 Drawing Sheets

PROCESSES TO PREPARE ANTIMONY DOPED TIN OXIDE ELECTROCONDUCTIVE POWDERS

FIELD OF THE INVENTION

The present invention relates to improved processes for preparing electroconductive antimony doped tin oxide powders comprising precipitation of such powders by adding antimony/tin salt solutions to a concentrated aqueous alkaline solution.

BACKGROUND OF THE INVENTION

Solution based precipitation routes are known to prepare antimony doped tin oxide electroconductive powders, but these processes tend to be volumetrically inefficient. Such known processes typically involve the simultaneous addition of acidic metal solutions and aqueous basic solutions to water while regulating the pH. Electroconductive powders used for making static dissipative packaging for electronic components, for example, must be essentially free of salts such as NaCl, a common byproduct in solution precipitation processes. The known processes require enormous quantities of water to reduce the chloride or other anion concentration to acceptable levels and very long filtration times. Because discharge of large quantities of water to waste streams is regulated, use of such large volumes is a disadvantage.

Japanese Patent No. 1-14174 describes a method to prepare conductive powders of antimony containing tin oxide which involves neutralizing an acidic solution of the chlorides of antimony and tin by adding the metal salt solution and an alkaline solution to water while maintaining pH at 2–6 to precipitate the hydrates of tin and antimony oxides, and recovering the precipitate by filtration and washing while at pH 2–6. The precipitate is then dried and calcined at 400°–1200° C. It is also disclosed that when a neutralization method different from this is used, for example, a method in which the aqueous solution of alkali is added to the hydrochloric acid aqueous solution of tin chloride and antimony chloride, or, conversely, a method in which the hydrochloric acid aqueous solution of tin chloride and antimony chloride is added to the aqueous solution of alkali, a fine tin oxide powder of the desired conductivity containing antimony cannot be obtained.

Known solution based methods to produce antimony doped tin oxide electroconductive powders tend to be inefficient with respect to pounds of product per reactor volume, washing of the precipitated products to reduce anions to an acceptable level, and filtration time. The present invention improves upon all of these deficiencies of the prior art to provide processes with greater volume efficiency to achieve more product per reactor volume. The present invention also provides processes which require less water and less time to wash the products to acceptable conductance levels.

SUMMARY OF THE INVENTION

The present invention comprises an improved solution precipitation process denoted herein as "reverse" for the preparation of antimony doped tin oxide electroconductive powder having at least 1% by weight antimony wherein the improvement comprises 1) preparing an aqueous salt solution of from about 20% to about 50% by weight tin salt and preparing an acidic salt solution of antimony.
2) combining the salt solutions to yield a mixture.
3) precipitating the powder by adding the mixture to a basic solution containing at least 20% base and maintaining the temperature at from about 50° C. to about 95° C. after initial heating of reaction and dilution, until a pH of from about 2 to about 4 is reached.

The present invention further comprises an improved solution precipitation process denoted herein as "sequential" for the preparation of antimony doped tin oxide electroconductive powder having at least 0.25% by weight antimony wherein the improvement comprises 1) preparing an aqueous salt solution of from about 20% to about 50% by weight tin salt and preparing an acidic salt solution of antimony.
2) adding a major portion of the tin salt solution to a basic solution containing at least 20% base and maintaining the temperature at from about 50° C. to about 95° C. after initial heating of reaction and dilution, to yield a first mixture.
3) combining the remainder of the tin salt solution with the antimony salt solution to yield a second mixture, and
4) precipitating the powder by adding the second mixture to the first mixture until a pH of from about 2 to about 4 is reached.

The present invention further comprises an improved solution precipitation process denoted herein as "regular" for the preparation of antimony doped tin oxide electroconductive powder having at least 0.25% by weight antimony wherein the improvement comprises 1) preparing an aqueous salt solution of from about 20% to about 50% by weight tin salt and preparing an acidic salt solution of antimony.
2) combining the salt solutions to yield a mixture,
3) precipitating the powder by adding a basic solution containing at least 20% base to the mixture and maintaining the temperature below about 95° C. after initial heating of reaction and dilution, until a pH of from about 2 to about 4 is reached.

DETAILED DESCRIPTION OF THE INVENTION

The present invention provides processes to prepare electroconductive antimony doped tin oxide powders that can be used in numerous applications for imparting conductivity to surfaces. All the processes of the present invention, the "reverse", "regular", and "sequential", employ concentrated tin salt and basic solutions and have very high volumetric efficiency which improves productivity for a given reactor size. The processes of the present invention have a volumetric efficiency in weight of product per reaction volume of at least 120 kg/m$^3$ (one lb/gal), preferably 240 kg/m$^3$ (two lb/gal). This typically is an improvement of about 4 times the efficiency of the "conventional" process as defined below.

The "reverse" and "sequential" processes which involve the addition of the tin and antimony chlorides to a concentrated base have the additional advantage of improving the wash efficiency with respect to both filtration time and quantity of water needed to reduce soluble ionic conductivity (due to the presence of dissolved ions) to levels acceptable for use in the manufacture, shipment and final use-assembly of sensitive electronic parts. These processes require at least 30% less water and preferably use only about ⅕ the water required for a "conventional" process. The filtration time for these processes is typically reduced by about at least 50%, and preferably requires about ⅓ the time of a "conventional" process.

By "conventional" process as used herein is meant a solution precipitation process for preparing electroconductive antimony doped tin oxide powders in which an aqueous basic solution and a mixture of acidic antimony solution and tin salt solution are added simultaneously to a vessel containing water while maintaining the pH within a particular range.

By "regular" addition process as used herein is meant a solution precipitation process for preparing electroconductive antimony doped tin oxide powders involving addition of a concentrated base to a solution of antimony and tin salts, typically an acidic solution of antimony and tin chlorides. The pH is changed from very acidic to less acidic.

By "reverse" process as used herein is meant a solution precipitation process for preparing antimony doped tin oxide electroconductive powders characterized by addition of a solution of antimony and tin salts, typically an acidic solution of the metal chlorides, to a concentrated base. The pH is changed from very basic to acidic.

By "sequential" process as used herein is meant a solution precipitation process for preparing antimony doped tin oxide electroconductive powders having acceptable properties containing from 0.25–20 wt %. antimony which involves sequential addition of the metal salts to a concentrated base. First nearly all of a tin solution is added to the base. A second addition step involves addition of the remaining tin chloride solution mixed with the antimony chloride solution to the base.

The "conventional" process is the process of the prior art. The "regular", "reverse" and "sequential" processes are processes of the present invention. The "regular" process provides improved volumetric efficiency over the "conventional" and other prior art processes. The "reverse" process provides both improved volumetric efficiency and improved wash and filtering efficiency for tin oxide powders containing from about 1% to 20% by weight antimony. The "sequential" process provides both improved volumetric efficiency and improved wash and filtering efficiency for tin oxide powders containing from about 0.25% to about 20% by weight antimony. Thus the "sequential" process is especially useful when the level of antimony is less than 1% by weight.

The order of addition of the reactants in the processes of this invention does not affect the volumetric efficiency. However, by adding a solution of the antimony and tin chlorides to the base, referred to as "reverse" addition, improved filtration times result and less washwater is required to achieve acceptable product quality. Electroconductive powders having acceptable properties with antimony levels as low as about 0.5 wt % can be achieved by the "reverse" process. A modification of this "reverse" process, denoted herein as the "sequential" process also provides a volumetrically efficient process which involves sequential addition of metal chloride solutions whereby most of a tin chloride solution is added to a base, prior to addition of an antimony chloride solution mixed with the remaining portion of the tin chloride solution. This modification allows for the preparation of electroconductive powders having acceptable properties with antimony levels as low as about 0.25 wt %.

An alternative process of this invention involves a "regular" addition, that is, adding base to a solution of antimony and tin chlorides. This process can provide powders that perform acceptably with antimony levels as low as about 0.25 wt % but the washing efficiency of the precipitated slurry is inefficient compared to the "reverse" addition process.

The "reverse" process of the present invention for preparation of tin oxide powders doped with from about 1% to about 20% by weight antimony comprises the following steps:

(1) preparing an acidic salt solution of antimony and an aqueous salt solution of from about 20% to about 50% tin salt,
(2) combining the salt solutions to yield a mixture,
(3) precipitating the powder by adding the mixture to a basic solution containing at least 20% base while maintaining the temperature at from about 50° C. to about 95° C. after initial heating of reaction and dilution until a pH of from about 2 to about 4 is reached.

The "sequential" process of the present invention for preparation of tin oxide powder doped with 0.25% to 20% by weight antimony comprises the following steps:

(1) preparing an acidic salt solution of antimony and an aqueous salt solution of from about 20% to about 50% by weight tin salt,
(2) adding a major portion of the tin salt solution to a basic solution containing at least 20% base and maintaining the temperature at from about 50° C. to about 95° C. after initial heating of reaction and dilution, to yield a first mixture,
(3) combining the remaining tin salt solution with the antimony salt solution to yield a second mixture, and
(4) precipitating the powder by adding the second mixture to the first mixture until a pH of from about 2 to about 4 is reached.

The "regular" process of the present invention for preparing antimony doped tin oxide powders containing from about 0.25 to about 20% by weight antimony comprises steps (1) and (2) from the "reverse" process above, followed by:

(3) precipitating the powder by adding a basic solution containing at least 20% base to the mixture from step (2), and maintaining the temperature from about 50° C. to about 95° C. after initial heating of reaction and dilution, until the pH of from about 2 to about 4 is reached.

For each of the above processes the solid powder product is recovered by filtration, washed to a washwater ionic conductance of about 100 micromhos (microsiemens) or less and then dried and calcined. In the powders, it is desirable to have high electrical conductance (low resistivity), but a low ionic conductance due to the detrimental effect of the presence of high levels of ions.

Any of the above processes can be conducted at lower temperatures, typically 15°–40° C. by use of suitable cooling methods. However, the volumetric efficiency is usually reduced because at the lower temperatures the precipitating slurry typically thickens, increasing its viscosity to the point where additional water must be added to maintain proper mixing of the slurry to complete the run. In addition, the wash efficiency of the slurry is also affected at lower reaction temperatures. For example, at temperatures less than about 50° C., significantly more filtration time and more water to wash the product to an acceptable washwater ionic conductance are required. Therefore the processes are preferably conducted at a temperature from about 50° C. to about 95° C. after the initial heats of reaction and dilution are experienced.

The "reverse" process of the present invention to prepare antimony doped tin oxide electroconductive powders containing from about 1% to about 20% antimony begins with the preparation of salt solutions of tin and antimony. The source of tin is usually tetravalent tin salts. A solution of from 20% to about 50% by weight tin salts is suitable. Especially preferred is a solution containing 50% by weight $SnCl_4$ and 50% by weight water. Although chloride is preferred, other water soluble salts such as sulfate and nitrate may also be suitable for use herein. It is important to use a highly concentrated tin salt solution to achieve the high volumetric efficiency for this process. The upper limit of concentration is the point at which the tin solution begins to fume, above about 50% by weight. Lower concentrations can be used but the volumetric efficiency of the process will be reduced. Lower concentrations may also affect other properties of the product such as color and dry powder resistivity.

The tin oxide is doped with antimony. An acidic salt solution of antimony is prepared in concentrated acid. It is convenient to dissolve the antimony chloride salt in HCl to generate the antimony solution. However other acids such as sulfuric acid and nitric acid may also be suitable. The concentration of the antimony salt solution is in the range of from about 1% to about 50% by weight antimony. A concentrated solution of the antimony salt of at least 20% by weight is preferred. However, for aqueous antimony solutions at concentrations above about 50% by weight $SbCl_3$, the solution can develop a cloudy precipitate over storage time. Very acidic antimony solutions are more stable and solutions comprised of 20% by weight $SbCl_3$ and 80% by weight concentrated HCl have been found to work well and are preferred. Less concentrated solutions will reduce the volumetric efficiency of the process of this invention.

The tin and antimony solutions are combined and mixed in a single vessel. This mixture is then pumped into a stirred basic solution. The basic solution is typically sodium hydroxide or possibly ammonium hydroxide or potassium hydroxide. The basic solution contains at least 20% by weight base. Preferably concentrated sodium hydroxide (50%) is used as the base to obtain a high degree of volumetric efficiency for this process. Such concentrated base solutions do have the drawback of potentially etching glass lined reaction vessels and in some cases it may be desirable to decrease the base concentration to alleviate this condition while sacrificing some of the volumetric efficiency.

The addition of the metal salt solution to the base is performed at a temperature of from about 20° C. to about 95° C. It is preferred to begin the reaction at ambient temperature and allow the heats of reaction and dilution to increase the temperature to a maximum of about 95° C. after the initial exotherm. Preferably the temperature is maintained at a maximum of from about 50° C. to about 90° C. Although a constant addition rate can be used, it is preferable to add the metal salt solution in stages, increasing the addition rate after the temperature is no longer increasing rapidly. One or more subsequent increases in the addition rate are made, particularly as the temperature begins to decrease after reaching its maximum. Staging the addition rate of the metal salt solution to the base by using a slower initial addition rate allows temperature control to limit the maximum temperature of the mixture to about 95° C. or less during the initial exotherm that is produced from the heats of dilution and reaction inherent in the process. Subsequently as the temperature decreases (due to adding a metal salt solution at ambient temperature to a relatively hot mixture of base and metal salts), the addition rate is increased to reduce the overall run time. At temperatures less than about 50° C., the reaction mixture typically thickens to a viscous consistency. Under these conditions it is usually necessary to add water to maintain adequate mixing conditions for the slurry.

The metal salt solution is added to the base to precipitate the powder until a final pH of from about 2 to about 4 is reached. The final pH of the reaction mixture has an effect on the washing performance and properties of the product powders. Above a final pH of about 4, all of the antimony may not precipitate thereby providing product powders with very high resistances. At a pH lower than about 2 the resistance may not change significantly, but the increased acidity results in the need to use more water and more time to wash out soluble salts and additional HCl from the product powder.

The product powder is collected by filtration, for example, by vacuum filtration. It is then washed with deionized water until the conductance of the wash is about 100 micromhos (microsiemens) or less. The product is then dried at from about 120° C. to about 150° C. in an oven.

The dried powder is then calcined in air, at a temperature in the range of from about 500° C. to about 900° C. for 30 minutes to 4 hours. The calcination temperature required for good conductivity in the powder is dependent on the amount of antimony dopant used, with lower dopant levels typically requiring higher calcination temperatures to obtain similar conductivities as powders containing high dopant levels.

The "sequential" process of the present invention which provides antimony levels in the product of from about 0.25% to about 20% by weight, does not involve initial mixing of the tin and antimony solutions but addition of the tin and antimony solutions in a sequential manner to a stirred basic solution. The tin and antimony solutions are prepared as described above for the "reverse" process. A concentrated base is employed as described above for the "reverse" process. About 70–95% of the tin solution is added to the basic solution at a rate such that the temperature of the product mixture increases from ambient to a maximum of about 95° C. The remaining tin solution is mixed with the antimony solution to generate a second mixture. This second mixture is then added to the base/tin slurry mixture to precipitate the product until a final pH of from about 2 to about 4 is reached.

The product powder is collected by filtration, and is washed with deionized water until the ionic conductance of the washwater is approximately 100 micromhos (microsiemens) or less. The product is then dried at 120° C. to 150° C. in an oven. The dried powder is calcined in air, at a temperature in the range of 500°–900° C. for 10 minutes to 4 hours.

A major advantage of the "reverse" and "sequential" processes of the present invention over the prior art is that considerably less time and washwater are required to reduce the soluble ionic conductance of the washwater to acceptable levels of approximately 100 micromhos (microsiemens) or less. The total volume of water relative to the amount of product produced in the process of this invention is significantly less than that used in "conventional" processes to prepare antimony doped tin oxide electroconductive powders.

The product of the "reverse" and "sequential" processes is also different from antimony doped tin oxide electroconductive powders of the prior art and is described in copending application docket number CH-2526, U.S. application Ser. No. 08/709,561. The product powder has an open pore structure wherein the pore volume is at least 0.005 cc/g for any pore diameter within the range of 0.1 to 8 micrometers.

The "regular" process of the present invention used to prepare antimony doped tin oxide electroconductive powders containing 0.25–20% by weight antimony involves adding a concentrated base to a metal salt solution. This process is performed using similar concentrated metal salt and base solutions as described for the "reverse" process.

The addition of base to metal salt solution is performed at temperatures from about 15° C. to about 95° C. It is preferred to begin the reaction at ambient temperature and allow the heats of dilution and reaction to increase the temperature to about 50° C. to 90° C. At temperatures less than about 50° C. the slurry may become so viscous that it may be necessary to add water so the mixture can continue to be effectively stirred throughout the addition of the base to the metal salt solution.

The base is generally added to the metal salt solution at a rate such that the temperature of the reaction mixture increases from ambient to a maximum of about 95° C., preferably to a maximum temperature of 50° C. to 90° C. Although a constant addition rate can be used, it is preferable to add the base in stages, increasing the addition rate after the temperature reaches its maximum. One or more subsequent increases in the addition rate are made, particularly as the temperature begins to decrease after reaching its maximum. Staging the addition rate of the base to the metal salt solution serves the same purpose as described above for the "reverse" addition process, that is, a lower initial addition rate to limit the maximum temperature of the reaction mixture to about 95° C. or less after the initial exotherms. After the temperature has reached a maximum, the addition rate can be increased.

The base is added to the metal salt solution to precipitate the product until a final pH of from about 2 to about 4 is reached. At temperatures less than about 50° C., the reaction mixture may thicken to a viscous consistency. Under these conditions it may be necessary to add water to maintain effective stirring.

The product powder is recovered in the same manner as described above, collected by filtration, washed with deionized water to a washwater conductance of approximately 100 micromhos (microsiemens) or less, dried at 120°–150° C. in an oven, and calcined at 500°–900° C. for 10 minutes to 4 hours, then cooled to room temperature.

The "regular" process of the present invention provides improved volumetric efficiency relative to the "conventional" process by using concentrated solutions of metal salts and base. There is no improvement in washing efficiency. However, the "regular" process does produce electroconductive antimony doped tin oxide powders having antimony levels as low as 0.25% by weight and low resistivity which is highly desirable in applications for which light color is important.

Overall at antimony concentrations of about 1.0% by weight or greater in antimony doped tin oxide powders, addition of metal chloride solution to base, "reverse" process, is preferred due to wash efficiency in comparison to the "regular" process, and provides a simpler process in comparison to "sequential" process. The "sequential" process is preferred to produce antimony doped tin oxide powders having antimony concentrations of 0.25–1% by weight. Reaction temperatures of greater than 50° C. for the "reverse", "sequential" and "regular" processes are preferred over reaction temperatures of less than 50° C. for better wash efficiency and because of higher volumetric efficiency. At antimony concentrations lower than 0.5% by weight, to about 0.25% by weight, the "sequential" and "regular" addition (base added to metal chloride) processes are preferred in order to prepare antimony doped tin oxide electroconductive powders with dry powder resistivities of less than 100 ohm.cm when measured at $27.6 \times 10^6$ Pa (4000 psi).

The processes of the present invention are useful to provide a method for improving volumetric efficiency in the preparation of antimony doped electroconductive powders. The "reverse" and "sequential" processes of the present invention are also useful to provide a method to improve the wash efficiency for removal of ions, in particular chlorides, during preparation of antimony doped electroconductive powders. This efficiency is achieved via reductions in the water volume and filtration time required to achieve an acceptable washwater conductance of 100 micromhos (microsiemens) or less.

The processes of the present invention are useful to prepare electroconductive antimony doped tin oxide powders that can be used in numerous applications for imparting conductivity to surfaces. Electroconductive tin oxide powders prepared by the processes of the present invention contain from about 0.25% to about 20% by weight antimony and an electrical resistance of the dry powder being less than 100 ohm.cm when measured at $27.6 \times 10^6$ Pa (4,000 psi). Generally, the lower the relative resistance of a dry powder, the higher the conductance in an end-use application. However, many other factors, such as the ability to form an interconnecting network in the end-use carrier matrix or binder system, may also affect end-use conductance.

The crystallite size of this powder increases with decreasing antimony content and ranges from about 5 nm (50 Angstroms) to about 50 nm (500 Angstroms) for antimony concentrations of 10% to 0.25% by weight, when using preferred calcination conditions.

The resistivity of an antimony doped tin oxide electroconductive powder prepared by the process of this invention is determined by a powder resistance test. The powder resistance test is performed with a cylindrical cell and a Carver laboratory press as detailed in U.S. Pat. No. 5,236,737, incorporated herein by reference. The cell is constructed with brass electrodes at the top and bottom, that fit snugly inside a cylindrical piece of plastic having an inner diameter of about 3 centimeters. Copper leads attached to the brass electrodes are connected to an ohm meter. With the bottom electrode in position, a sample of electroconductive powder is introduced into the plastic cylinder and the top electrode is placed in position above the powder. The height of the powder should be about 2 cm before any pressure is exerted on it. Using a Carver laboratory press, the powder sample is compressed between the upper face of the bottom electrode and the lower face of the top electrode. The height and electrical resistance of the powder are then measured, the latter with an ohm meter. The measurement of the height and resistance are taken at a compression of 4000 psi.

The value of the powder resistance at the compression used is obtained by the following: Resistivity, r=(Resistance×Area)/Height Resistance is measured in ohms. Area is the area of the cylinder cross-section in square centimeters. Height is the length of the powder column between the top and bottom electrodes in centimeters.

Antistatic properties are important in all steps of the manufacture, shipment, and final use-assembly of sensitive electronic parts, such as computer chips, because these parts need to be protected from electrostatic discharge. This requires that all work surfaces and objects which come in contact with these parts be made electrically conductive to prevent build-up of electrostatic charges. Electrostatic charge build-up and its subsequent rapid discharge can damage electronic parts. As a consequence, manufacturers of such parts employ conductive coatings containing electroconductive powders for floors, walls, and furniture in the "clean rooms" where electronic parts are produced. Plastic shipping containers for shipment of electronic parts need to have conductive coatings to prevent electrostatic discharge damage of the parts during shipment. The powders prepared by the processes of the present invention are suitable for these uses.

Other examples for uses of electroconductive powders prepared by the processes of the present invention are in dielectric printing processes that use conductively coated transparent film or paper as a substrate. Thin films or coatings containing electroconductive powders can be used in polymer films, magnetic recording tapes, on work surfaces, and in paints to impart electroconductive properties.

The processes of the present are illustrated in more detail in the examples which follow. Unless stated to the contrary, composition is on a weight percentage basis.

EXAMPLES

EXAMPLE 1

A 4 liter glass beaker was charged with 917 g of 50% by weight aqueous NaOH solution which was stirred with a paddle at about 100 rpm. To a 2 liter glass beaker were charged 47 g of an antimony chloride solution containing 80% by weight of concentrated HCl and 20% by weight of $SbCl_3$ and 1556 g of a tin chloride solution containing 50% $SnCl_4$ and 50% water by weight. This solution of antimony and tin chlorides was then stirred.

The metal chloride solution was pumped from a balance into the 4 liter glass beaker containing the base solution at a rate of about 6 ml/min. Temperature was allowed to increase from about 25° C. to 75° C. as the metal chloride solution was added to the base. After pumping about 300 g of the metal chloride solution, the rate of pumping was increased to about 10 ml/min., and then after pumping an additional 50 g, the rate was increased to 20 ml/min. Finally after pumping an additional 250 g, the rate was increased to 25 ml/min. and this rate was maintained throughout the remainder of the addition. The metal chloride solution was added to the base until 1480 g total of solution had been added, after which the reaction was stopped. The final pH of the slurry was about 3.

The slurry was filtered and washed with deionized water to a washwater conductance of 104 micromhos (microsiemens) using a conductance probe which required 32.5 liters of deionized water and approximately 10 hours.

The wet filter cake was oven dried at 120° C., then calcined in air at 600° C. for two hours. The product powder was mechanically milled in a small laboratory blender to break up the larger agglomerates. The powder contained 1.1% by weight antimony with a primary crystallite size of 17.8 nm (178 Angstroms) as determined by X-ray diffraction line broadening with an average particle size of 1.2 micrometers as measured using a Microtrac Particle Size Analyzer available from Leeds & Northrup, and a dry powder resistivity of 17 ohm.cm. The single point BET surface area was 18.4 $m^2/g$ determined by the method of Branauer, Emmett and Teller, *J. Amer. Chem. Soc.*, Vol.60, p.309 (1938).

The volumetric efficiency of this run was about 282 $kg/m^3$ (2.35 lbs/gal) based on a final slurry volume of about 1.6 liters and theoretical weight of the calcined powder based on $SnO_2$ and $Sb_2O_5$ of about 427.8 grams.

COMPARATIVE EXAMPLE A

A process similar to that of Example 1 was repeated using 917 g of 50% aqueous NaOH solution stirred in a 4 liter beaker at 100 rpm and a metal chloride solution consisting of 47 g of an antimony chloride solution containing 80% by weight of concentrated HCl and 20% by weight of $SbCl_3$ and 1556 g of a tin chloride solution containing 50% $SnCl_4$ and 50% water by weight.

The metal chloride solution was pumped from a balance into the 4 liter glass beaker containing the base solution at a rate of about 20 ml/min. Temperature increased from about 25° C. to a maximum of 90° C. after 400 g of the metal chloride solution had been added. The metal chloride solution was added to the base until a total of 1400 g had been added, after which the reaction was stopped at a final pH of 5.5.

The slurry was filtered and washed to a washwater conductance of 44 micromhos (microsiemens) which required 10.5 liters of deionized water and approximately 7 hours.

The wet filter cake was dried in an oven at 120° C. and then calcined in air at 600° C. for two hours. The product powder was mechanically milled in a small laboratory blender to break up any large agglomerates. The powder contained nominally 1.1% by weight antimony and was characterized in the same manner as Example 1, with an average particle size of about 1.1 micrometers and a dry powder resistivity of 6,000,000 ohm.cm. The primary crystallite size was 5.2 nm (52 Angstroms) as determined by X-ray diffraction line broadening. The single point BET surface area was 37.9 $m^2/g$ determined as in Example 1.

COMPARATIVE EXAMPLE B

The process of Example A was repeated. The metal chloride solution was pumped at a continuous rate of 20 ml/min. A maximum temperature of 90° C. was reached after 400 g of the metal chloride solution had been added. A total of 1603 grams of metal chloride solution was pumped into the base resulting in a final pH of about 1.0 for the slurry.

The slurry was filtered and washed to a washwater conductance of 300 micromhos(microsiemens) which required 50.0 liters of deionized water and approximately 23 hours.

The wet filter cake was dried in an oven at 120° C. and then calcined in air at 600° C. for two hours. The product powder was mechanically milled in a small laboratory blender to break up any large agglomerates. The powder contained nominally 1.1% by weight antimony with an average particle size of about 1.2 micrometers and a dry powder resistivity of 21 ohm.cm. The primary crystallite size was 18.5 nm (185 Angstroms) and the single point BET surface area was 17.7 $m^2/g$.

Figure 1:
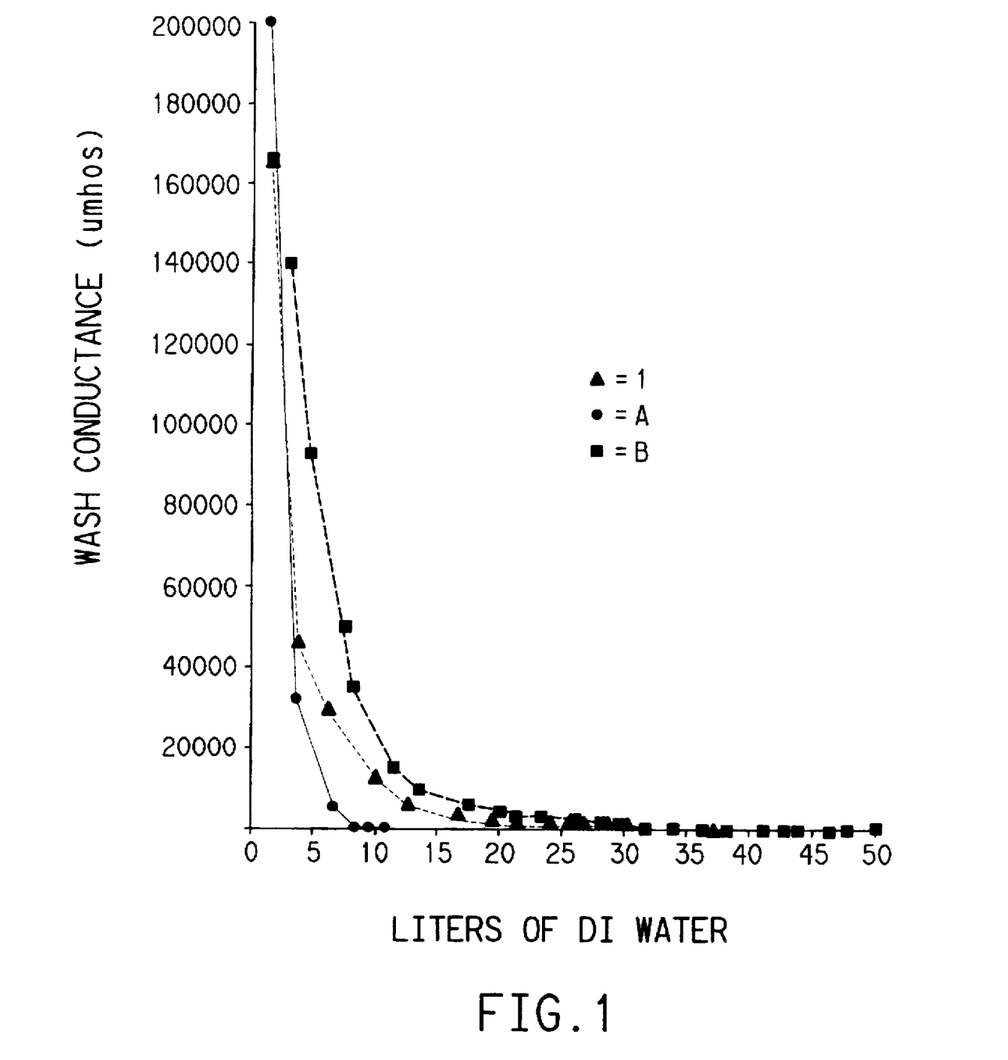
FIG. 1 is a graph of soluble ionic conductance of washwater in micromhos (reciprical ohms or microsiemens) versus total amount of water in liters used to wash the powders in Examples 1, A, and B. Example 1 is represented by triangles, Example A by circles, and Example B by squares.

FIG. 1 shows the wash data for Example 1, and comparative Examples A and B in terms of conductance of the washwater in micromhos (microsiemens), a measure of the ion content of the slurry versus the cumulative total of deionized water used to wash the powders in liters. The final pH, total wash time, final washwater conductance and dry powder resistivity are shown in Table 1. As seen in FIG. 1, a reaction slurry terminated at a pH of 5.5 (Comparative Example A) washes most efficiently but yields a calcined powder with a very unacceptable dry powder resistivity (6,000,000 ohm.cm) at 1% by weight antimony. A reaction slurry terminated at a pH of 1.0 (Comparative Example B) yielded a final product with a good dry powder resistivity (21 ohm.cm) but showed a wash curve that was much less efficient than that of a reaction slurry terminated at a pH of 3.0 (Example 1). Therefore, the operative range for the final slurry pH was determined as 2 to 4, with 3 being the preferred value.

TABLE I

| Example | pH | Washtime, Hrs. | Conductance Micromhos | Dry Powder Resistivity ohm · cm |
|---------|-----|----------------|----------------------|-------------------------------|
| 1 | 3.0 | 10 | 104 | 17 |
| A | 5.5 | 7 | 44 | 600,000 |
| B | 1.0 | 23 | 300 | 21 |

EXAMPLE 2

A process similar to that of Example 1 was repeated using 917 g of 50% aqueous NaOH solution stirred in a 4 liter beaker at 100 rpm and a metal chloride solution consisting of 47 g of an antimony chloride solution containing 80% by weight of concentrated HCl and 20% by weight of $SbCl_3$ and 1556 g of a tin chloride solution containing 50% $SnCl_4$ and 50% water by weight. The temperature was maintained at between 15° and 35° C. by means of an ice bath.

The metal chloride solution was pumped from a balance into the 4 liter glass beaker containing the base solution at a rate of about 6 ml/min. After pumping about 800 g of the metal chloride solution, the rate of pumping was increased to about 12 ml/min., and the agitation speed was increased to 150 rpm. After pumping 1304 g total of metal chloride solution, the addition was stopped as the slurry had thickened to a pudding-like consistency. 1.5 liters of deionized water was then added to the slurry. Addition of the metal chloride solution was started again added at a pump rate of 18 ml/min. A total of 1480 g of metal chloride solution was added, after which the reaction was stopped. The final pH of the slurry was about 3.

The slurry was filtered and washed to a washwater conductance of 45 micromhos (microsiemens) which required 34.5 liters of deionized water and approximately 21 hours.

The wet filter cake was dried in an oven at 120° C. and then calcined in air at 600° C. for two hours. The product powder was mechanically milled in a small laboratory blender to break up any large agglomerates. The powder contained nominally 1.1% by weight antimony with an average particle size of about 30 micrometers and a dry powder resistivity of 61 ohm.cm. The crystallite size was 19.7 nm (197 Angstroms) and the single point BET surface area was 20.1 m²/g. The volumetric efficiency of this run was about 140 kg/m³ (1.17 lbs/gal). Comparing Examples 1 and 2, reaction temperatures of greater than 50° C. were preferred over reaction temperatures of less than about 50° C. because of higher volumetric efficiency.

EXAMPLE 3

To a 2 liter glass beaker were charged 44 g of an antimony solution containing 80% by weight of concentrated HCl and 20% by weight of $SbCl_3$ and 1436.6 g of a tin solution containing 50% $SnCl_4$ and 50% water by weight. This solution was stirred and then was transferred to a 4 liter beaker equipped with a paddle and stirred at 150 rpm.

A 50% NaOH solution was pumped from a balance into the 4 liter beaker containing the metal chloride solution at a rate of about 20 ml/min. Temperature was observed to increase from about 27° C. to 81° C. after 340 ml of the base had been added at which time the pump rate was changed to 10 ml/min. A maximum temperature of 90° C. was reached after 600 ml total of the base had been added to the metal chlorides. The slurry slowly cooled with further addition of base. After addition of 820 g total of base, 500 ml of deionized water were added to lower viscosity and to improve agitation. After addition of 840 g total of base, 500 ml more of deionized water were added. The remaining base was then added to the slurry until 917 grams of 50% NaOH had been added. The final temperature was 59° C. and final pH was 3.

The slurry was filtered and washed to a washwater conductance of 83 micromhos (microsiemens) which required 50 liters of deionized water and approximately 68 hours.

The wet filter cake was dried in an oven at 120° C. and then calcined in air at 600° C. for two hours. The product powder was mechanically milled in a small laboratory blender to break up any large agglomerates. The powder contained nominally 1.1% by weight antimony with an average particle size of about 129 micrometers and a dry powder resistivity of 7 ohm.cm. The crystallite size was 21.3 nm (213 Angstroms) and the single point BET surface area was 18.5 m2/g.

EXAMPLE 4

The process of Example 3 was repeated to prepare a 0.25% by weight antimony doped tin oxide powder while maintaining the temperature of the slurry between 15° C. and 35° C. A metal chloride solution was prepared by mixing 12.0 grams of an antimony chloride solution containing 80% by weight of concentrated HCl and 20% by weight of $SbCl_3$ with 1556.0 g of a tin chloride solution containing 50% of $SnCl_4$ and 50% water by weight. The metal chloride solution was stirred in a 4 liter beaker at 150 rpm.

A 50% NaOH solution was pumped from a balance at a rate of about 6 ml/min. into the 4 liter beaker containing the metal chloride solution which was positioned in a salt/ice water bath. The initial temperature was 16° C. At a pH of about 1, the precipitated slurry began to thicken and the agitation rate was increased from 150 to 250 rpm. The slurry quickly thickened and agitation stopped. 500 ml of deionized water was then added and mechanical stirring was used to restart the agitator. Another 500 ml of deionized water was added. The NaOH solution was added until a final pH of 3.0 was reached.

The slurry was filtered and washed to a washwater conductance of 240 micromhos (microsiemens) which required 81 liters of deionized water and approximately 56 hours.

The wet filter cake was dried in an oven at 120° C. and then calcined in air at 600° C. for two hours. The product powder was mechanically milled in a small laboratory blender to break up any large agglomerates. The powder contained nominally 0.25% by weight antimony with an average particle size of about 31 micrometers and a dry powder resistivity of 333 ohm-cm. The crystallite size was 22.4 nm (224 Angstroms) and the single point BET surface area was 23.6 m²/g. When the oven dried powder was calcined at 700° C. for two hours it had a dry powder resistivity of 62 ohm.cm, a crystallite size of 34.2nm (342 Angstroms), and a surface area of 14.4 m²/g.

Figure 2:
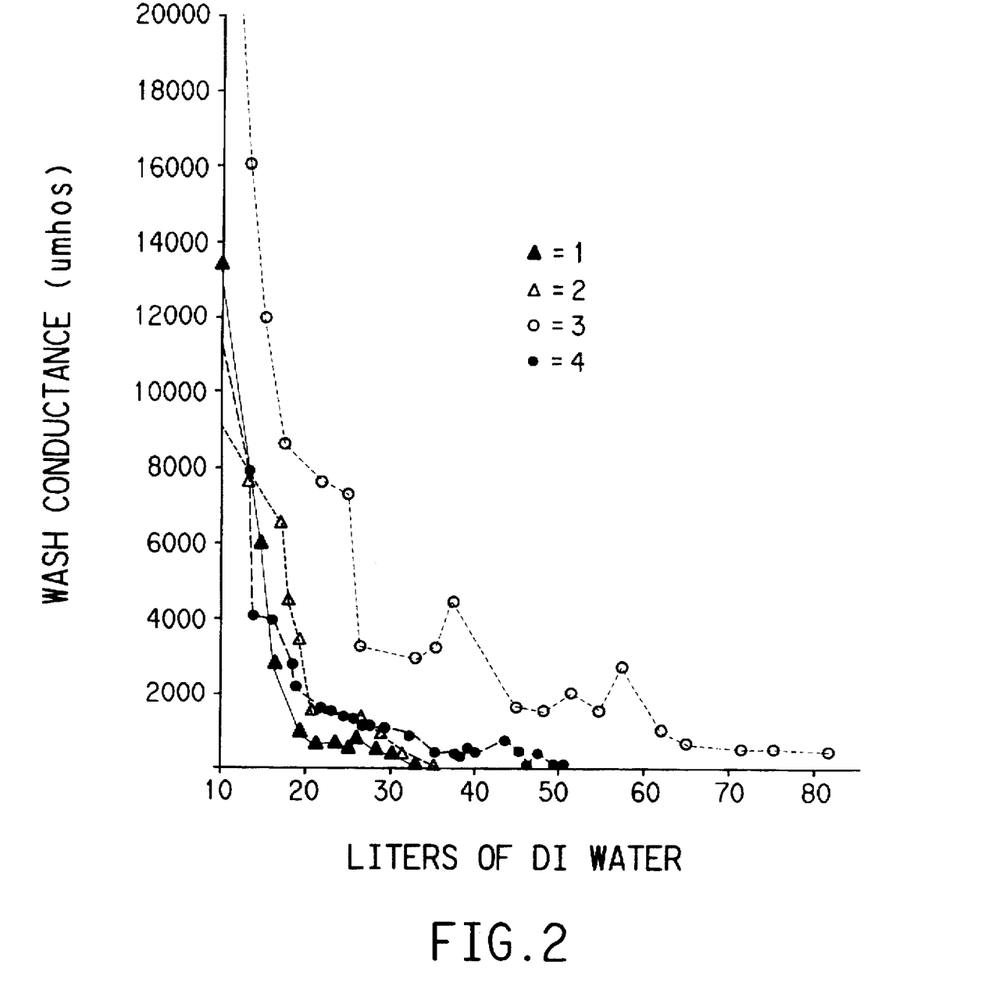
FIG. 2 is a graph of soluble ionic conductance of washwater in micromhos (microsiemens) versus total amount of water in liters used to wash the powders in Examples 1, 2, 3, and 4. Example 1 is represented by black triangles, Example 2 by white triangles, Example 3 by black circles, and Example 4 by white circles.

FIG. 2 shows the wash data for Examples 1, 2, 3, and 4 in terms of conductance of the washwater in micromhos (microsiemens) versus the total volume of washwater in liters. The total wash time, final conductance, relative slurry temperature, order of addition of reactants and dry powder resistivity of the calcined powders are listed in Table II.

It is preferred to wash the powders using as little water in as short a period of time as possible. The data from FIG. 2 showed that the "reverse" process of Example 1, addition of metal chloride to base, was preferred over the "regular" process of Example 3 due to better wash efficiency. For both processes, comparing Example 1 with Example 2 for "reverse", and Example 3 with Example 4 for "regular" a higher reaction temperature resulted in better washing efficiency than a lower reaction temperature.

TABLE II

| Example | Washtime Hrs. | Washwater Conductance Micromhos | Dry Powder Resistivity ohm-cm | Maximum Process Temperature °C. | Process Type |
| --- | --- | --- | --- | --- | --- |
| 1 | 10 | 104 | 17 | 75 | Reverse |
| 2 | 21 | 45 | 61 | 35 | Reverse |
| 3 | 68 | 83 | 7 | 81 | Regular |
| 4 | 56 | 240 | 62 | 16 | Regular |

COMPARATIVE EXAMPLE C

A process similar to that of Example 1 was repeated using 917 g of 50% aqueous NaOH solution stirred in a 4 liter beaker at 100 rpm and a metal chloride solution consisting of 11.75 g of an antimony chloride solution containing 80% by weight of concentrated HCl and 20% by weight of $SbCl_3$ and 1556.0 g of a tin chloride solution containing 50% $SnCl_4$ and 50% water by weight.

The metal chloride solution was pumped from a balance into the 4 liter glass beaker containing the base solution at a rate of about 20 ml/min. The metal chloride solution was added to the base until a total of 1480 g had been added, after which the reaction was stopped at a final pH of 3.0. The slurry was filtered and washed to a final washwater conductance of 431 micromhos (microsiemens).

The wet filter cake was dried in an oven at 120° C. and then calcined in air at 600° C. for two hours. The product powder was mechanically milled in a small laboratory blender to break up any large agglomerates. The powder contained nominally 0.25% by weight antimony with a dry powder resistivity of about 32,000 ohm.cm.

EXAMPLE 5

A 400 ml glass beaker was charged with 87 g of 50% by weight aqueous NaOH solution which was then stirred. A burette was charged with 144 g (about 95 ml) of an aqueous 50% tin chloride solution. The tin solution was slowly dripped into the base allowing the temperature to rise to about 90° C.

After 82 ml of the tin solution was added, addition was stopped. 1.0 g of an antimony chloride ($SbCl_3$) solution in concentrated HCl (20:80 by weight) was added to the remaining 13 ml of tin solution in the burette.

The tin/antimony solution was then added to the tin/base slurry solution. After completion of addition, the final slurry temperature was about 90° C. and the final pH was about 3.

The precipitate was washed, dried, and calcined at 750° C. for 2 hours. The product had a nominal antimony content of 0.25% and a DPR of 95 ohm.cm.

Comparing Example C and Example 5 demonstrated that the "seqential" process was preferred to produce antimony doped tin oxide powders having antimony concentrations of 0.25% to 1% by weight. At antimony concentrations of about 0.25% by weight, the "sequential" process was preferred in order to prepare antimony doped tin oxide electroconductive powders with dry powder resistivities of less than 100 ohm.cm when measured at $27.6 \times 10^6$ Pa (4000 psi).

What is claimed is:

1. A reverse solution precipitation process for the preparation of antimony doped tin oxide electroconductive powder having at least 1% by weight antimony comprising 1) preparing an aqueous salt solution of from about 20% to about 50% by weight tin salt and preparing an acidic salt solution of antimony, 2) combining the salt solutions to yield a mixture, 3) precipitating the powder by adding the mixture to a basic solution containing at least 20% base while maintaining the temperature at from about 50° C. to about 95° C. after initial heating of reaction and dilution, until a pH of from about 2 to about 4 is reached, wherein the weight of powder obtained per reaction volume is at least 120 kg/m³ (one lb/gal.).

2. A sequential solution precipitation process for the preparation of antimony doped tin oxide electroconductive powder having at least 0.25% by weight antimony comprising 1) preparing an aqueous salt solution of from about 20% to about 50% by weight tin salt and preparing an acidic salt solution of antimony, 2) adding a major portion of the tin salt solution to a basic solution containing at least 20% base and maintaining the temperature at from about 50° C. to about 95° C. after initial heating of reaction and dilution to yield a first mixture, 3) combining the remainder of the tin salt solution with the antimony salt solution to yield a second mixture, and 4) precipitating the powder by adding the second mixture to the first mixture until a pH of from about 2 to about 4 is reached, wherein the weight of powder obtained per reaction volume is at least 120 kg/m³ (one lb/gal.).

3. A solution precipitation process for the preparation of antimony doped tin oxide electroconductive powder having at least 0.25 % by weight antimony comprising 1) preparing an aqueous salt solution of from about 20% to about 50% by weight tin salt and preparing an acidic salt solution of antimony, 2) combining the salt solutions to yield a mixture, 3) precipitating the powder by adding a basic solution containing at least 20% base to the mixture and maintaining the temperature below about 95° C. after initial heating of reaction and dilution, until a pH of from about 2 to about 4 is reached, wherein the weight of powder obtained per reaction volume is at least 120 kg/m³ (one lb/gal.).

4. A method to improve wash efficiency for removal of ions during preparation of antimony doped electroconductive powder comprising 1) preparing an aqueous salt solution of from about 20% to about 50% by weight tin salt and preparing an acidic salt solution of antimony, 2) combining the salt solutions to yield a mixture, 3) precipitating the powder by adding the mixture to a basic solution containing at least 20% base while maintaining the temperature at from about 50° C. to about 95° C. after initial heating of reaction and dilution, until a pH of from about 2 to about 4 is reached, 4) recovering the powder by filtration, wherein the weight of powder obtained per reaction volume is at least 120 kg/m$^3$ (one lb/gal.), and 5) washing the powder with water to a maximum wash-water conductance of at least 100 micromhos (microsiemens).

5. The process of claim 1, 2 or 3 wherein the electroconductive powder has a dry powder resistivity of a maximum of 100 ohm.cm at 27.6×10$^6$ Pa (4000 psi).

6. A method to improve wash efficiency for removal of ions during preparation of antimony doped electroconductive powder comprising 1) preparing an aqueous salt solution of from about 20% to about 50% by weight tin salt and preparing an acidic salt solution of antimony, 2) adding a major portion of the tin salt solution to a basic solution containing at least 20% base and maintaining the temperature at from about 50° C. to about 95° C. after initial heating of reaction and dilution to yield a first mixture, 3) combining the remainder of the tin salt solution with the antimony salt solution to yield a second mixture, and 4) precipitating the powder by adding the second mixture to the first mixture until a pH of from about 2 to about 4 is reached, 5) recovering the powder by filtration, wherein the weight of powder obtained per reaction volume is at least 120 kg/m$^3$ (one lb/gal.), and 6) washing the powder with water to a maximum wash-water conductance of at least 100 micromhos (microsiemens).

\* \* \* \* \*